United States Patent
El Kaed et al.

(10) Patent No.: US 11,797,275 B2
(45) Date of Patent: Oct. 24, 2023

(54) MODEL DRIVEN METHODS FOR ONTOLOGY BASED APPLICATION DEVELOPMENT

(71) Applicants: SCHNEIDER ELECTRIC USA, INC., Andover, MA (US); Charbel Joseph El Kaed, Boston, MA (US); André Ponnouradjane, Andover, MA (US)

(72) Inventors: Charbel Joseph El Kaed, Boston, MA (US); André Ponnouradjane, Andover, MA (US)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 0 days.

(21) Appl. No.: 16/629,718

(22) PCT Filed: Jul. 9, 2018

(86) PCT No.: PCT/US2018/041233
§ 371 (c)(1),
(2) Date: Jan. 9, 2020

(87) PCT Pub. No.: WO2019/014101
PCT Pub. Date: Jan. 17, 2019

(65) Prior Publication Data
US 2021/0149647 A1 May 20, 2021

Related U.S. Application Data

(60) Provisional application No. 62/530,449, filed on Jul. 10, 2017.

(51) Int. Cl.
*G06F 8/36* (2018.01)
*G06N 20/00* (2019.01)
*G06F 8/60* (2018.01)

(52) U.S. Cl.
CPC ............ *G06F 8/36* (2013.01); *G06F 8/60* (2013.01); *G06N 20/00* (2019.01)

(58) Field of Classification Search
CPC .............. G06F 8/36; G06F 8/60; G06N 20/00
See application file for complete search history.

(56) References Cited

U.S. PATENT DOCUMENTS

| 9,372,684 B1 * | 6/2016 | Dufresne | G06F 8/70 |
| 2003/0179228 A1 * | 9/2003 | Schreiber | G06F 16/25 |
| | | | 707/E17.058 |

(Continued)

FOREIGN PATENT DOCUMENTS

EP 2518620 A1 10/2012

OTHER PUBLICATIONS

Muhammad Golam Kibria et al., "A User-Centric Knowledge Creation Model in a Web of Object-Enabled Internet of Things Environment", [Online], pp. 24054-24086, [Retrieved from Internt on Apr. 23, 2021], <https://www.mdpi.com/1424-8220/15/9/24054> (Year: 2015).*

(Continued)

*Primary Examiner* — Ziaul A Chowdhury
(74) *Attorney, Agent, or Firm* — Lando & Anastasi, LLP

(57) ABSTRACT

System and methods of ontology model development are disclosed. An example system and method may comprise, defining, an ontological model, generating, an ontology library based on the ontological model, deploying, the ontology library to an IoT system, generating, an ontology instance based on the ontology library deployed to the IoT system, modifying, an IoT application based on the ontology instance, and managing the IoT system utilizing the IoT application.

18 Claims, 6 Drawing Sheets

(56) References Cited

U.S. PATENT DOCUMENTS

| | | | | |
|---|---|---|---|---|
| 2011/0035418 | A1* | 2/2011 | Butler, IV | G06F 16/367 |
| | | | | 707/809 |
| 2011/0289520 | A1* | 11/2011 | Grigoriev | G06F 16/958 |
| | | | | 719/331 |
| 2012/0112883 | A1* | 5/2012 | Wallace | G16H 50/80 |
| | | | | 340/10.1 |
| 2012/0197832 | A1* | 8/2012 | Shanmukh | G06F 8/74 |
| | | | | 706/46 |
| 2013/0091139 | A1* | 4/2013 | Rajpathak | G06F 40/30 |
| | | | | 707/740 |
| 2017/0060542 | A1* | 3/2017 | Mandal | G06F 16/835 |
| 2017/0109253 | A1 | 4/2017 | Shen | |
| 2017/0180489 | A1* | 6/2017 | Oh | H04L 67/36 |
| 2017/0212748 | A1* | 7/2017 | Agnew | G06F 8/36 |
| 2018/0239816 | A1* | 8/2018 | Di Balsamo | G06F 16/334 |

OTHER PUBLICATIONS

Notification of Transmittal of the International Search Report and the Written Opinion of the International Searching Authority from corresponding PCT/US2018/041233 dated Sep. 20, 2018.

* cited by examiner

MODEL DRIVEN METHODS FOR ONTOLOGY BASED APPLICATION DEVELOPMENT

RELATED APPLICATIONS

This application is a U.S. National Stage Application under 35 U.S.C. § 371 of International Application No. PCT/US2018/041233, filed Jul. 9, 2018, titled MODEL DRIVEN METHODS FOR ONTOLOGY BASED APPLICATION DEVELOPMENT, which claims the benefit under 35 U.S.C. § 119(e) of U.S. Provisional Application No. 62/530,449, filed Jul. 10, 2017, titled MODEL DRIVEN METHODS FOR ONTOLOGY BASED APPLICATION DEVELOPMENT, both of which are hereby incorporated by reference in their entirety for all purposes.

PRIORITY CLAIM

This application claims priority to and benefit from the following provisional patent application: U.S. Provisional Application Ser. No. U.S. 62/530,449 titled "Model Driven Methods for Ontology Based Application Development" filed on Jul. 10, 2017. The entire contents of this aforementioned patent application are expressly incorporated by reference herein.

FIELD OF THE INVENTION

Embodiments of the present disclosure relate generally to methods of data processing, and more specifically to model driven methods for ontology based application development.

BACKGROUND

The Internet of Things (IoT) promises several opportunities and added value services in several types of venues such as residential, commercial, and industrial. Such opportunities may be enabled through the connectivity and cooperation between the various "things" or edge points in the IoT. However, many such opportunities are still facing the interoperability challenge of the heterogeneous nature of these end points. Semantic technology and linked data are well positioned to tackle these heterogeneity problem and associated interoperability challenges. Several efforts contribute to the development of an ontology software suite ranging from modeling and developing, to storing, and querying. However, despite the potential and the promises, the semantic technology remains in the hands of the few ontology experts.

Based on this challenge, there is a need for an ontology based, model driven methodology to develop existing ontology libraries and frameworks in order to accelerate the adoption and development of ontology-based IoT applications without a need for ontology experts.

SUMMARY

System, methods, and computers executing ontology model development are disclosed. An example system and method may comprise, defining, an ontological model, generating, an ontology library based on the ontological model, deploying, the ontology library to an IoT system, generating, an ontology instance based on the ontology library deployed to the IoT system, modifying, an IoT application based on the ontology instance, and managing the IoT system utilizing the IoT application.

Further embodiments of the system, method, and computer contemplate the defined ontological model is composed of a plurality of ontological models, defined by an autonomous system, and/or defined by a machine learning system.

Additional embodiments of the system, method, and computer contemplate the generated ontology library is directed towards an embedded IoT application or a cloud based IoT application.

Further embodiments contemplate a processor readable non-transitory storage media that includes instructions for managing data, wherein execution of the instructions by one or more hardware processors performs actions, comprising defining an ontological model, generating an ontology library based on the ontological model, deploying the ontology library to an IoT system, generating an ontology instance based on the ontology library deployed to the IoT system, modifying an IoT application based on the ontology instance, and managing the IoT system utilizing the IoT application.

BRIEF DESCRIPTION OF THE DRAWINGS

These accompanying drawings are not intended to be drawn to scale. In the drawings, each identical or nearly identical component that is illustrated in various figures, is represented by a line numeral. For purposes of clarity, not every component may be labeled in every drawing. In the drawings.

DETAILED SUMMARY

Figure 1:
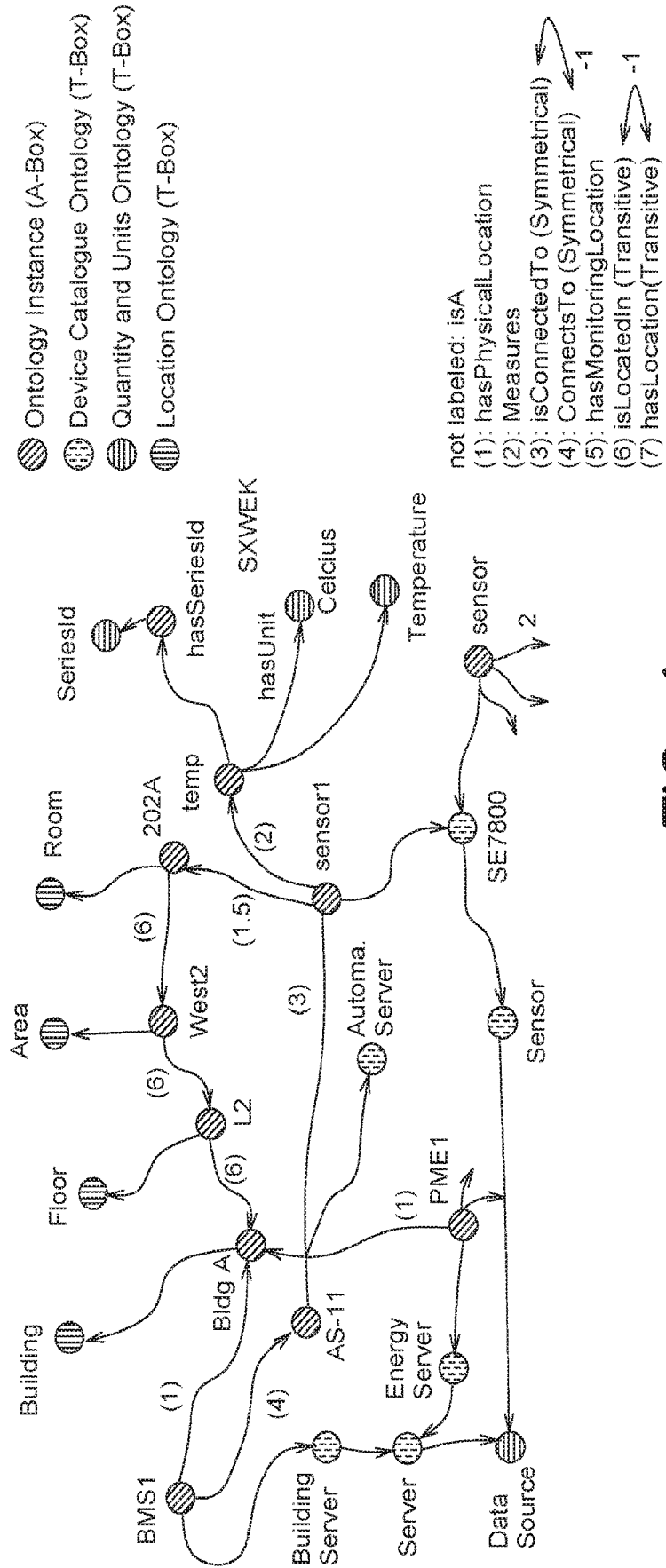
FIG. 1 illustrates aspects of an ontology representation in accordance with various embodiments of model driven methods for ontology based application development.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e. "including but not limited to."

The Internet of Things (IoT) is expected to interconnect at a massive scale, numerous sensors, devices, gateways, and systems to tackle many challenges in a variety of industries. Such inter-connectivity is an essential part in designing industrial systems with added value services which are more energy efficient with lower costs while contributing to a better environment. These benefits promoted by the emergence of the Industrial Internet of Things (IIoT) have surged the importance of interoperability among the things to turn this vision into reality.

Designing IoT applications utilizes a shared understanding of the exchanged data among those "things." Semantic technology is an evolving field in the knowledge representation domain, expected to enable IoT interoperability. The World WideWeb Consortium (W3C) defines a set of standards, which consist among others, representation and query languages offering a beneficial ecosystem to address the heterogeneity challenge in the IoT. In industrial environments and automation domains, the semantic technology has been used to solve various data interoperability issues and to provide context aware applications and services.

In addition to standardization, several resources contribute to the development of the ontology software suite. Examples of these include ontology editors, storage, inference engines, and/or graphical tools to represent, edit, and query. Developers generally utilize two types of frameworks in the form of Serializers, such as RDF4J and Object Relational Mappers (ORM), such as RomanticWeb.

Semantic technology and ontology-based IoT applications are still generally utilized only by ontology experts. One potential reason of the exclusion of others in the domain may be the absence of adequate methodologies and tools involving several other major actors participating in the design life-cycle of an IoT application useable by others than an expert of ontological systems. One proposed set of solutions may include a model driven methodology along with a software module approach removing barriers for IoT developers and accelerating the adoption of the semantic technologies. One example of a proposed module may be validated based on the SAREF ontology.

Serializers may be utilized to provide reading/writing from/to an ontology file, a SPARQL protocol endpoint, and/or a persistent Resource Description Framework (RDF) store. RDF Serializers may be implemented in various programming languages, examples include OWL API, RDF4J, and/or Jackson-Jsonld, in Java, dotNetRDF in .Net, Redland in C, and RDFLib in Python. A Serializer Application Programming Interface (API) may provide low level classes and functions to manipulate concepts directly mapped to the RDF language without any higher-level abstractions. Therefore, it is helpful by any IoT developer to be aware of the technical aspects and theory of the RDF concepts and principals in order to implement ontology-based IoT applications.

Some Serializers may offer basic code generation through a plugin which takes an ontology as an input and generates code facilitators or stubs. For example, the Protégé code generation plugin, which may be integrated in Protégé provides generation of Java code based on the OWL API. However, the code generation may be partial in nature where only the class name and interface are provided along with an associated empty constructor. A developer may decide to complete the generated code by relying, for examples, on the OWL API which may be directly mapped to the RDF concepts. A RDF4J Schema generator extends the RDF4J API and provides an automatic generation of an RDF schema from an ontology. Generated output of the ontology may be contained in one java file which contains only the Internationalized Resource Identifier (IRI) of each concept of the ontology. One result of this process is "flat" code generation, where there are no classes, associations, or constraints between the generated elements. A developer may then implement the association, mapping, and constraints manually.

AutoRDF may extend the Redland library and propose a generator which takes an ontology and generates C++ object oriented code to manipulate RDF concepts. The generated code is an abstraction layer which consists in a set of functions based on the ontology classes and relations available to be used by developers to generate ontology instances (A-Box).

Object Relational Mappers (ORM) may be built on top of Serializers and provide an object-oriented abstraction layer allowing developers to manipulate objects instead of RDF concepts. Several ORMs are available in various programming languages, such as KOMMA, Empire, and/or AliBaba in Java, RomanticWeb and TrinityRDF in .Net, and RDFAlchemy in Python. ORMs utilize "code decoration" where a developer annotates code with tags referencing IRIs from the ontology terminology (T-Box). A number of the Java ORM rely on the Java Persistence API (JPA) while the .Net ORMs rely on the Entity Framework. During the code implementation of an application, the developer may request a factory to instantiate the ontology (A-Box) and can formulate SPARQL queries by relying on SPARQL query builders or adapters such as the LINQ to SPARQL in the .Net domain.

The following ORMs provide some code generation features. As one example, AliBaba offers the three following interesting features for ontology developers. First, Object server exposes the object factory through a REST API putting the available objects as resources on the web for manual annotation. Second, Aspect behaviors which allow each object of the factory to intercept a method call and execute a specific behavior. Annotation such as precedes provides the developer with a better control with the behavior execution flow. Third, SPARQL queries decoration on the getter/setters of objects which enables dynamic queries execution.

As another example, KOMMA relies on the Eclipse Modeling Framework (EMF). KOMMA provides a unified framework with three layers. First, an object mapping persistence layer. Second, a visualization tool. Third, an ontology editor based on the capabilities of the EMF. KOMMA details a code generator plugin, however, it is not integrated in visualization and editing layers, therefore, the mapping and implementation of the interfaces remain manual for the developer. KOMMA's unified approach may target ontology developers with the integration of the three layers in a common framework.

Utilizing this general approach, FIG. 1 illustrates aspects of an ontology representation in accordance with various embodiments of model driven methods for ontology based application development. Embodiments may include, but are not limited to, residential, commercial, and/or industrial systems that are comprised of various ontologies such as device types, quantity and units, and/or location.

FIG. 1 illustrates one of many potential examples of an ontology representation based on embodiments of the disclosed concept. A device catalog (e.g. Building Server, Server . . . ), quantity and units (e.g. Data Source, Temperature . . . ), and location (e.g. Building, Floor . . . ) (T-Box) ontology are created. Ontology models (A-Box) are also created and maintained (e.g. Bldg A, L2, West2, 202A). Further, these A-Box may formulate queries to extract T-Box data, by relying on one of the available RDF development libraries depicted in the previous section. In this way a user may ascertain specific information about an object without being an expert in that object. As one example, a user could query "Where is my building server?" and receive a response of "Building A, Floor 2, West Area, Room 202A." A user or system no longer need be an expert to query and receive actionable information.

Two other desirable factors emerge regarding this ontology-based IoT applications development method. First, is the technical feasibility of ontology-based vertical and horizontal solutions in an industrial context. Several ontological designs demonstrate benefits for both vertical and horizontal deployments. In a vertical deployment or silo, a sensor to gateway or a device/system to cloud connection is combined with a domain specific application. A general example is when several end points (e.g. sensors) are in communication with a communication aggregating device such as a gateway. This gateway may then be in communication with a cloud. A variety of vertical silos may be utilized based on technical domain (e.g. Industrial Systems), geography (e.g. Building A), technology domain (e.g. temperature sensors), and/or a combination of all.

A horizontal deployment may consist of integrating different silos (verticals) driving across domains of interoperability among systems and devices. As one of many examples, two industrial systems, a building management and a power solution system, may be connected to the cloud. In these cases, we have seemingly disparate systems with an ability to relate to each other via a common ontology. As highlighted previously, a significant benefit of this disclosure is the ability to no longer need an expert in all of these domains for a user to be able to utilize the system as a whole.

Second, an adaptation layer exposes the information of the systems through an ontology representation which may be consumed by a business intelligence layer to extract information based on the various business intelligence systems. Furthermore, FOrTÉ a cloud based federated query ontology and timeseries engine may be deployed enabling big data queries for business and machine learning applications. Additionally, the emergence of domain specific ontologies in the industry and standardization bodies. For one example, in the Smart Buildings domain, ontologies such as SAREF and extensions, Haystack, and Brick have emerged. In addition, efforts have been proposed regarding energy modeling and access such as Siemens Work, SPITFIRE, and the Optique Platform2.

These combinations now allow the creation and optimization of relationships both in the existing systems a user is responsible for and the potential for any external data (e.g. data lakes) that may exist. Further, these relationships may be utilized for management of the respective business operations either through recommendations to a user who may then articulate changes, through autonomous systems, and/or a combination of the two. Finally, these relationships and optimized data may be used in other machine learning systems to further optimize the respective systems based on the relationships formed, optimized, executed and learned. Other benefits related to embodiments of this disclosure are described below.

Ontologies are powerful to represent internal systems topology such as the interconnectivity between the devices and sensors, their physical locations, and their functional interactions. While utilizing an ORM provides a useful abstraction layer, a mapping is still typically required through code decoration. However, IoT developers may leverage a Just Instantiate and Link library that may be imported into a development environment, where the concepts and relationships of the ontology model (T-Box) are provided utilizing the described method. Once such library is imported, a developer can instantiate the ontology concepts and link them together into an ontology instance (A-Box). Such libraries can rely on, for example, existing SDKs and other available libraries. This ability lessens the burden on developers to be experts in the related IOT systems they are programming.

A wide variety of programming languages may be used to obtain the benefits of embodiments of the disclosure. Diversity of various industry segments, business, and implementations benefit from diversity of skill sets to utilize different programming languages to implement IoT-based applications. These applications may range from embedded devices (c, c++, python), systems (c++, .net, java) and/or cloud applications. Therefore, it is advantageous to support such Just Instantiate and Link library support and various dependencies to third party libraries and programming languages. It should be appreciated these are mere examples of programming languages able to be utilized in various embodiments of this disclosure.

A wide variety of query language may be used. Storing and retrieving data on a system or cloud is highly advantageous in various embodiments of this disclosure. IoT development communities are often varied regarding the query language utilized. While some are familiar with query languages such as SQL or LINQ and advocate for their reuse in the IoT ontology-based development, other developers utilize SPARQL as an evolving, non-tabular query language. Alternatives such as the visual query builders may be utilized to generate SPARQL through a visual tool and use it in the IoT development. It should be appreciated these are mere examples of query languages able to be utilized in various embodiments of this disclosure.

Figure 2:
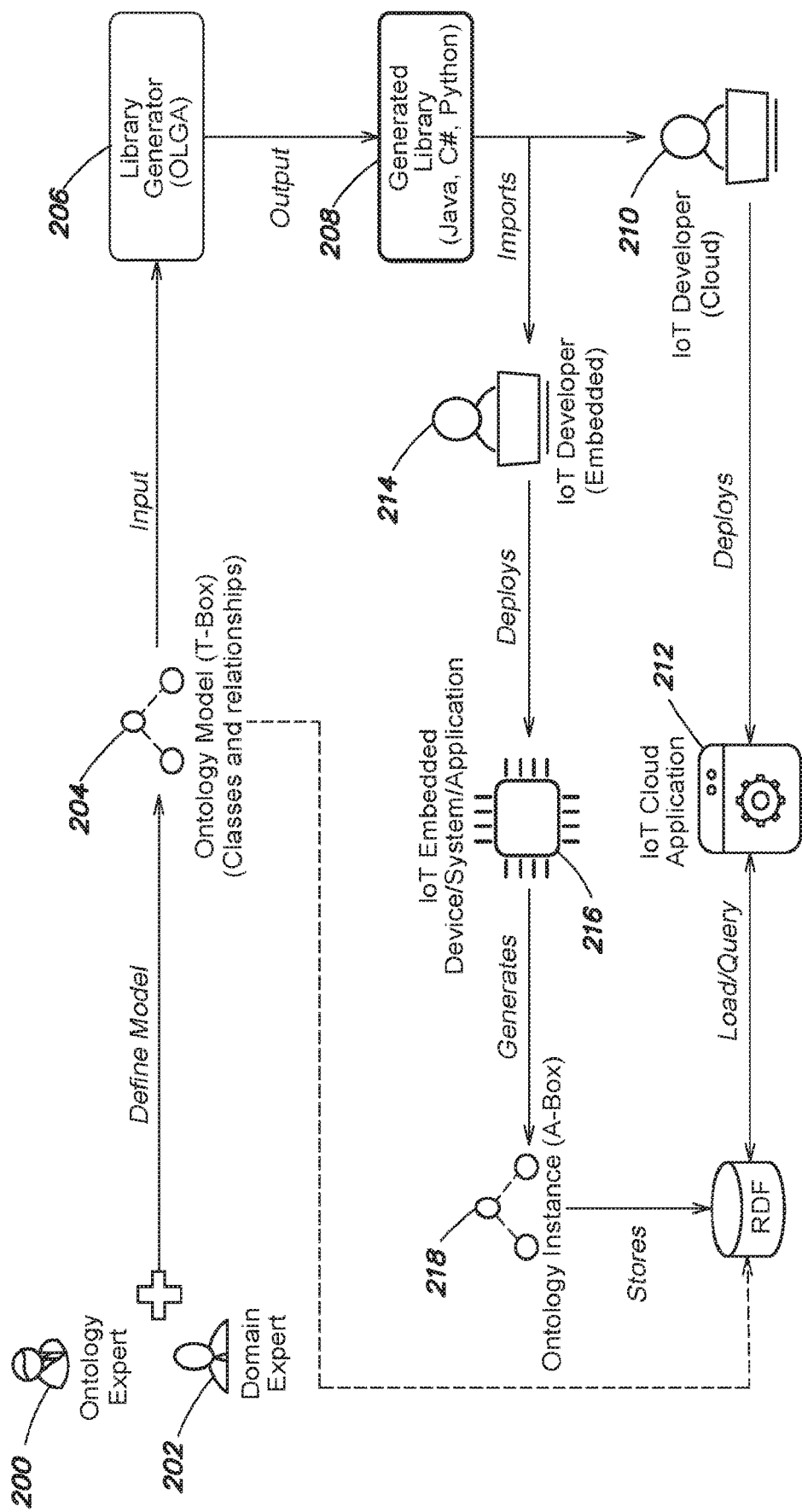
FIG. 2 illustrates aspects of a flow diagram in accordance with various embodiments of model driven methods for ontology based application development.

FIG. 2 illustrates aspects of a flow diagram in accordance with various embodiments of model driven methods for ontology based application development. The flow diagram includes an ontology expert, a domain expert, one or more ontology characteristics, one or more ontology libraries, one or more ontology models, one or more IoT Systems, one or more data stores, IoT developers, and/or one or more IoT applications. It should be appreciated these are mere examples of a flow diagram and various elements are able to be utilized in various embodiments of this disclosure.

The ontology expert 200 may be an ontology practitioner who generally has experience in the ontology development tools, languages, and storage infrastructure. Examples of their tasks may consist of assisting a domain expert 202 in capturing the concepts to be used in an IoT application deployed in a specific domain. The domain expert 202 may be a product owner and/or a technical architect. They generally have global and/or specific knowledge on how a specific system is deployed, commissioned, and/or operated. They may work in concert with the ontology expert 200 and articulate concepts and/or the relations of a system to the ontology expert 200.

It should be appreciated some embodiments may utilize none, one, or more of each of these roles as some ontology models (T-box) 204 may be retrieved from memory, generated automatically, and/or from a machine learning system. Further one individual may operate in multiple roles as both an ontology expert 200 and domain expert 202 or teams may serve in these roles and may create ontology concepts and relations to form ontology models (T-Box) 204 as described infra, and proposes an ontology for further processing.

Figure 3:
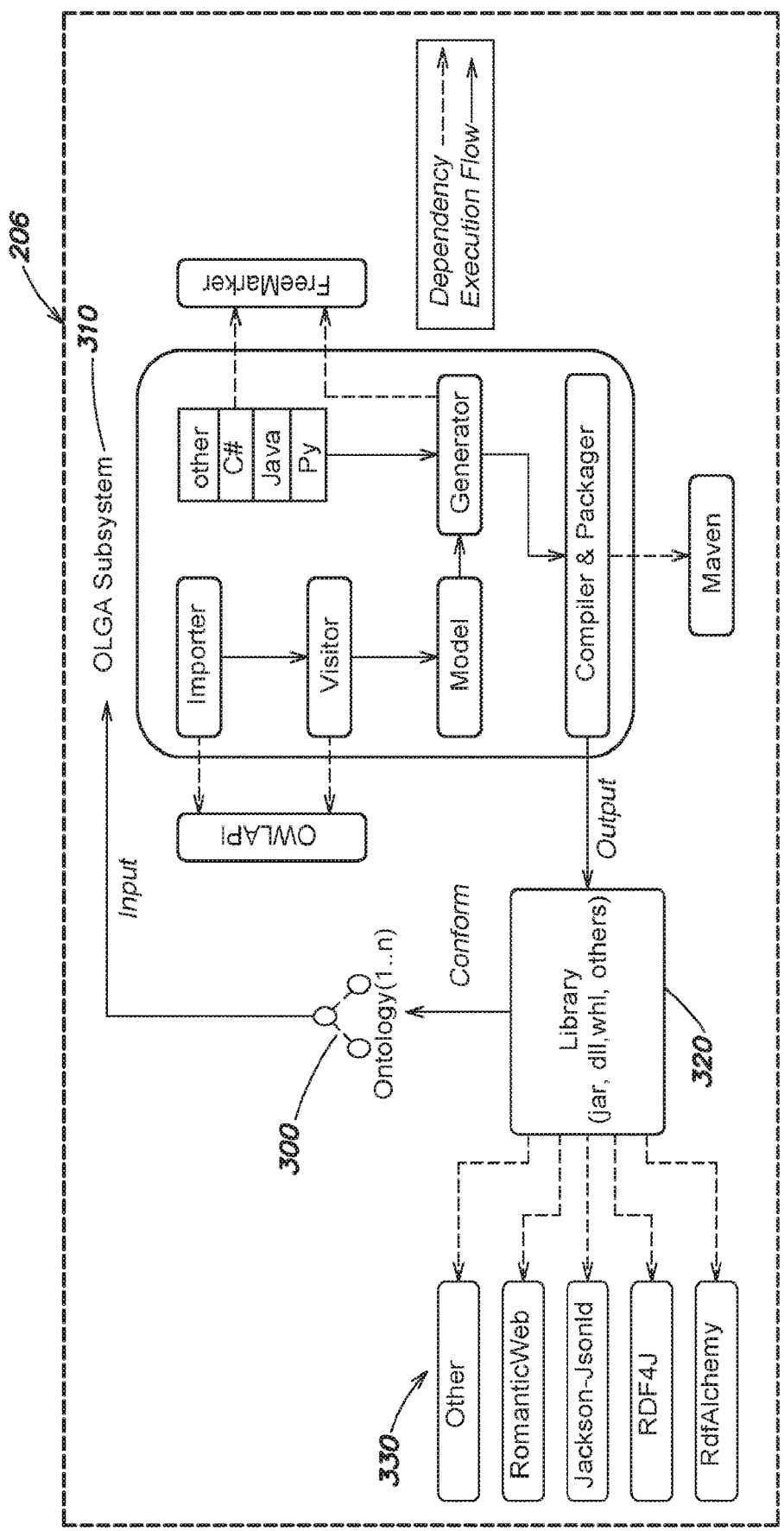
FIG. 3 illustrates aspects of a system architecture in accordance with various embodiments of model driven methods for ontology based application development.

An ontological model (T-Box) 204 may be provided to an Ontology Library GenerAtor (OLGA 206), also detailed infra in FIG. 3. OLGA 206 receives an ontology and its imported ontologies along with a selection of the desired library or framework. OLGA 206 then generates a library 208 to conform to the ontology model (T-Box) 204 previously defined. A generated library 208 abstracts away the ontology complexity and enables IoT developers to instantiate and link the ontology classes and relations previously defined by the ontology expert 200 and domain expert 202. A generated library 208 may depend on a Serializer or an object relation mapper library. An ontological model (T-Box) 204 may also or additionally be provided to an RDF store for additional/future use. The ontology expert 200 and/or the domain expert 202 may iterate, extend or reuse or extend existing ontology models 204.

An embedded IoT Developer 214 may implement an embedded IoT application 216 using the ontology model (T-Box) 204 previously defined by the experts 200, 202. This embedded IoT application 216 may be for a device and/or system. The embedded IoT Developer 214 may import the generated library 208 containing the ontological concepts and relations previously defined to instantiate the embedded IoT application 216.

An ontology instance (A-Box) 218 may be derived from the embedded IoT application 216. Once integrated the ontology concepts are linked together into an ontology instance (A-Box) 218. An ontology instance (A-Box) 218 may also or additionally be provided to an RDF store for additional/future use.

The cloud IoT Developer 210 may implement the IoT application 216 using the ontology model (T-Box) 204 previously defined by the experts' 200, 202. This cloud based application 212 may be for one or more cloud systems. The cloud IoT Developer 210 would import the generated library 208 containing the ontological concepts and possible relations previously defined to instantiate the model. The IoT application 216 may also or additionally be provided to an RDF store for additional/future use.

An IoT developer may import the generated library 208 and embed the generated library into a device, system, and/or an IoT cloud application. Once integrated into an existing system or device, the generated library may have several applications. In one example, used with commissioning software of a Building Management System, where the generated library 208 is used to instantiate an ontology model of a system for a given facility, an ontology instance 218 may capture several aspects of the system shown in FIG. 1. The ontology instance may then be sent along with the model to a cloud storage where a business application layer or an IoT cloud-based application can query and extract information about a specific Smart Building to drive better insights. At the cloud level, a developer may also import a library generated library 208 by OLGA 206 supporting their choice of the programming language and technology. A generated library may conform to the same ontology defined by the experts and will be used to interact with an RDF store to load and query instances of the model to fulfill the cloud application requirements.

An additional benefit of embodiments of the described methodology enable the separation of aspects and roles, and places the complexity in areas where it can be solved by relying on adequate tools and domain expertise. A domain expert 202 generally has both an overall and specific knowledge about a specific system and domain. An ontology expert 200 may be a modeling practitioner but may lack the overall system vision and domain knowledge expertise. Finally, IoT developers 210, 214 may now select the programming language and the framework of their choice to implement ontology-based IoT applications by relying on the generated library which is conform to the ontological model without the complexity of the ontology languages.

FIG. 3 illustrates aspects of a system architecture in accordance with various embodiments of model driven methods for ontology based application development. Embodiments of this architecture may include, but are not limited to, a multi-library generator, Importer, Visitor, Model, Generator, Compiler & Packager, and/or various tools and resources generally utilized to create applications across platforms.

OLGA 206 is a multi-library code generator with various embodiments illustrated in FIG. 3. OLGA 206 may accept various inputs, including one or more ontologies 300. It is noteworthy that an ontology may depend on other ontologies and a choice of a library dependency. Various embodiments contemplate a generated library may depend either on a Serializer or an ORM. OLGA 206 may use previously existing libraries and frameworks. By providing IoT developers with the variety of choices for the development of ontology-based IoT applications, OLGA 216 enables the possibility for an IoT developer to choose and reuse existing open source libraries (e.g. Serializers or ORMs) while offering an abstraction and library to use which conforms to an ontology model previously specified by the various domain experts.

Various embodiments of OLGA 206 consist of the following OLGA subsystems 310. An Importer loads into memory the one or more input ontologies 300 and process them into a single optimized ontology. A Visitor traverses all the elements of the ontology processed by the Importer. The Visitor processes one or more of the following ontology elements: Classes, ObjectProperties, DataProperties, Individuals, Literals, and/or the various axioms to populate the data model, as shown in the example illustrated in FIG. 4. It should be appreciated that either or both of the Importer and/or Visitor may interact with an OWL API to create, manipulate, and/or serialize OWL ontologies.

A Model allows the input of the ontology information (T-Box) independent of any targeted library or programming language. Separating the model from any targeted implementation offers OLGA 206 flexibility in supporting another language or dependent library using templates. Model is populated by the Visitor and consists of a representation layer which captures all the elements of an ontology. An illustration of this Model is in FIG. 4. Elements of the Model are inherited from the super class node which is identified by an IRI and a name parameter.

Each class may have none (owl:Thing) or multiple super classes populated by the Visitor based on the owl:SubClassOf. Classes such as namespace, packageName, and className are extracted based on the Class IRI for the code generator. An example template used by OLGA 206 to generate RomanticWeb-based code may appear as follows:

```
<#if consolidatedImports??>
<#list consolidatedImports as import>
using ${import};
</#list>
</#if>
namespace ${Zclass.getPackageName( )}
{
[Class("${Zclass.Iri( )}")]
public interface I${Zclass.ClassName( )}
<#if Zclass.SuperZClassList( )??>
<#if Zclass.SuperZClassList( )?has_content> :
<#list Zclass.SuperZClassList( ) as
SuperZClassCurrentElementOfList>
```

-continued

```
I${SuperZClassCurrentElementOfList.ClassName( )}<#sep> ,
</#list>
<#else>: IEntity
</#if>
</#if>
{
<#if listDataProperties??>
<#list listDataProperties as DataPropertyList>
[Property("${DataPropertyList.DataProperty( )}")]
${DataPropertyList.RangeXSDType( )}
${DataPropertyList
.DataPropertyShortForm( )?capitalize}{ get; set; }
</#list>
</#if>
}
<#if listObjectProperties??>
...
</#if>
}
```

Figure 4:
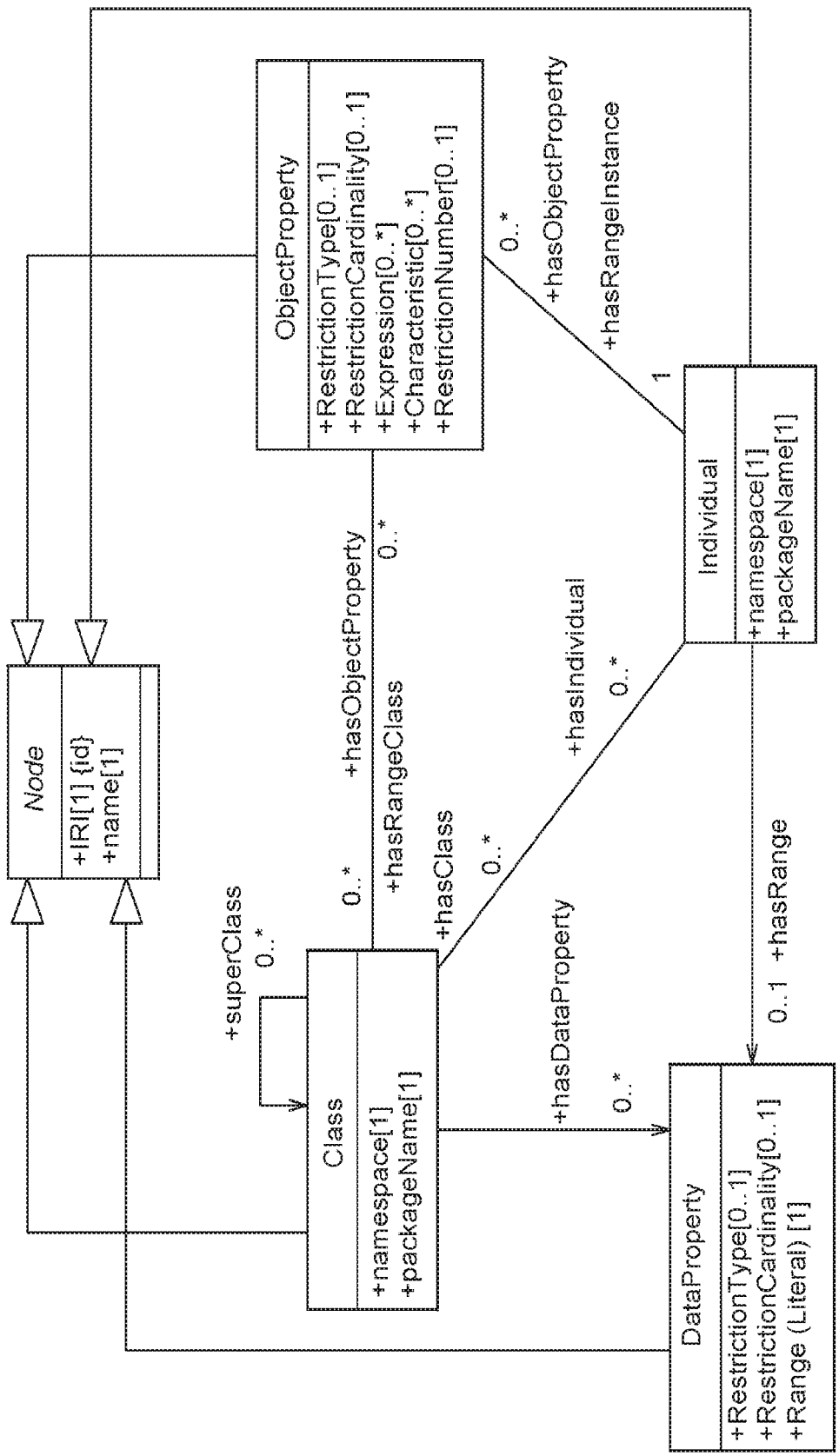
FIG. 4 illustrates aspects of a data model diagram in accordance with various embodiments of model driven methods for ontology based application development.

A class may have none or several ObjectProperties, in the data model illustrated in FIG. 4. A Visitor may populate the following parameters for each ObjectProperty: a restriction type (owl:AllValuesFrom), an optional restriction cardinality (owl:minCardinality), a restriction number associated with the cardinality, a possible one or more characteristic of the property (owl:TransitiveProperty), and an optional expression (owl:UnionOf). An ObjectProperty associates the following concepts:

Class-to-Class(es): one or several range classes depending on the restriction type and the expression. For example, a Building contains Some Floor.

Class-to-Individual(s): one or several range individuals depending on the restriction type and the Expression. For example, a TemperatureMeasure Class hasUnit Degree_Celsius Individual.

Individual-to-Individual: the restriction type, cardinality, expression, and characteristic are not populated by the visitor when an individual is associated to another individual. For example, a Building1 contains Floor1. Only the name parameter is used in the ObjectProperty for the code generation.

An Individual is an instance of a class. A Visitor fills the namespace and the packageName for the code generator based on its IRI. When a DataProperty is associated with an Individual, the Visitor populates only the range (Literal). However, when the DataProperty is associated with a class, the Visitor populates in addition to the previous parameters, the restriction type and the restriction cardinality.

Templates may be arranged by library dependency, a serializer (Jackson-Jsonld, RDF4J) and/or ORM (RomanticWeb). As shown in the above template example, each template may contain a code snippet written according to a programming language syntax (Java, C#, Python, or others) and may hold various information awaiting to be filled from the data model such as the imports declaration of packages related to the dependent library, name of the class/interface to be generated, among others. In addition, each of the data and object property will be transformed into a parameter with getter/setter functions. These templates will be loaded in memory by the Generator and the code snippets will be completed according to the information populated in the data model.

Generator may be based on the selected library dependency, where adequate templates are loaded into memory to initiate the code generation from the populated data model. Generator injects the information from the data model into the templates. A separation between the model and the templates provides flexibility and makes supporting an additional library a matter of templates extension. In the case of a selected ORM dependency, each Class and Individual of the ontology may be generated into an interface. In fact, an ORM library provides a factory allowing developers to instantiate the interfaces into objects. OLGA 206 handles multiple inheritance and composition by generating interfaces extending other interfaces. This makes code generation more efficient since potentially only the interfaces need to be generated. Developers may utilize the factory to instantiate their objects based on the generated interfaces, therefore, the ORM's factory will handle multiple extensions of the interfaces and their declared functions.

In the event of a selected Serializer dependency, interfaces and their implementations are generated, as a Serializer does not generally provide a factory to instantiate/implement a class. OLGA 206 handles multiple inheritance and composition by propagating the functions' implementations from the extended interfaces into the implemented classes and by relying on the Override annotation in Java (or similar) annotations in other programming languages.

Compiler and Packager are utilized once the code is injected into the templates. A Generator creates files containing the expected code, after which the compilation and packaging phase can begin. According to the selected library 320 and its programming language an appropriate compiler is loaded. Once the compilation ends successfully, the packaging of the compiled image is triggered to prepare the adequate format (.jar, .dll, .whl, or others).

Once the generated library is packaged 330, it may be imported and ready to be used by any IoT developer. An example of a SAREF generated library is provided infra, where an IoT developer may Just Instantiate and Link, an Idegree_Celsius is refereed to, then an indoor measurement is created and linked to a specific instance of a Temperature Sensor. Such code implemented by the IoT developer may then be deployed on a cloud connected device or gateway. On systems with more abundant resources such as a Building Management Server, a generated library dependent on an object relational mapper may be used since such systems may host local applications which can interact with a local RDF store.

FIG. 4 illustrates aspects of a data model diagram in accordance with various embodiments of model driven methods for ontology based application development. Embodiments of this data model utilized by the system architecture illustrated in FIG. 3 may consist of a representation layer which captures elements of an ontology.

OLGA 206 may be deployed on any general-purpose computer system and utilizes a wide variety of languages, libraries, and options. Some examples include, the OWL API to import and merge one or more interdependent ontologies. A Visitor module utilizes the OWL API to generate the merged ontology and populate the data model shown in FIG. 4. A Generator utilizes FreeMarker Template Engine and the templates are written in the FreeMarker Template Language. FreeMarker offers a beneficial mechanism to inject parameters from the data model into the templates to generate code files. A Compiler and Packager module utilizes Maven plugins depending on the selected programming language, .Net3, Java4, and Python5. OLGA 206 generates a pom.xml file which may be used with the correspondent Maven plugin to compile and package. It should be appreciated, these are illustrative examples only and the supported dependent libraries is expected to grow with time based on the adoption and available technology.

An example of SAREF instantiation code to generate an ontology library:

```
public static void Create_SAREF_Topology( )
{
//refer to the unit
Idegree_Celsius degreeCelius = context
.Create<Idegree_Celsius>(new Uri(clientURI + "#1"));
//Create a measurement from the factory
IMeasurement indoorTemperature = context
.Create<IMeasurement>(new Uri(clientURI + "#2"));
indoorTemperature.AddIsmeasuredin_Only_UnitOfMeasure
.Add(degreeCelius);
indoorTemperature.Hasvalue = 32;
indoorTemperature.Hastimestamp = DateTime.UtcNow;
//Link it to Temperature
ITemperature temperature = context
.Create<ITemperature>(new Uri(clientURI + "#3"));
temperature.AddRelatestomeasurement_Only_Measurement
.Add(indoorTemperature);
//Create a Temperature Sensor
ITemperatureSensor temperatureSensor = context
.Create<ITemperatureSensor>(new Uri(clientURI + "#4"));
temperatureSensor.Hasmanufacturer = "CompanyA";
temperatureSensor.Hasmodel = "M321";
temperatureSensor
.Hasdescription = "Low range Zigee temperature sensor";
//add its measurement
temperatureSensor.AddMakesmeasurement_Only_Measurement
.Add(indoorTemperature);
// commit data to factory
context.Commit( );
}
```

As detailed previously, any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 5:
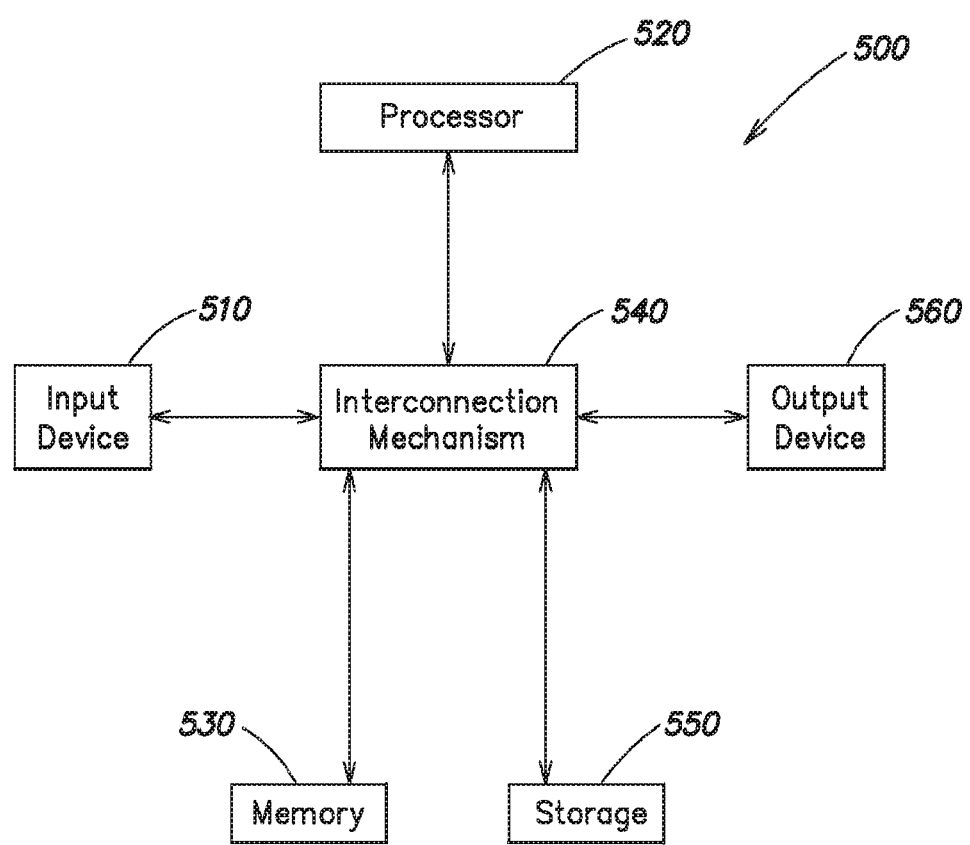
FIG. 5 is a functional block diagram of a general-purpose computer system in accordance with embodiments of model driven methods for ontology based application development.

For example, various embodiments of the disclosure may be implemented as specialized software executing in a general-purpose computer system 500 such as that shown in FIG. 5. The computer system 500 may include a processor 520 connected to one or more memory devices 530, such as a disk drive, memory, or other device for storing data. Memory 530 is typically used for storing programs and data during operation of the computer system 500. The computer system 500 may also include a storage system 550 that provides additional storage capacity. Components of computer system 500 may be coupled by an interconnection mechanism 540, which may include one or more busses (e.g., between components that are integrated within the same machine) and/or a network (e.g., between components that reside on separate discrete machines). The interconnection mechanism 540 enables communications (e.g., data, instructions) to be exchanged between system components of system 500.

Computer system 500 also includes one or more input devices 510, for example, a keyboard, mouse, trackball, microphone, touch screen, and one or more output devices 560, for example, a printing device, display screen, speaker. In addition, computer system 500 may contain one or more interfaces (not shown) that connect computer system 500 to a communication network (in addition or as an alternative to the interconnection mechanism 540).

Figure 6:
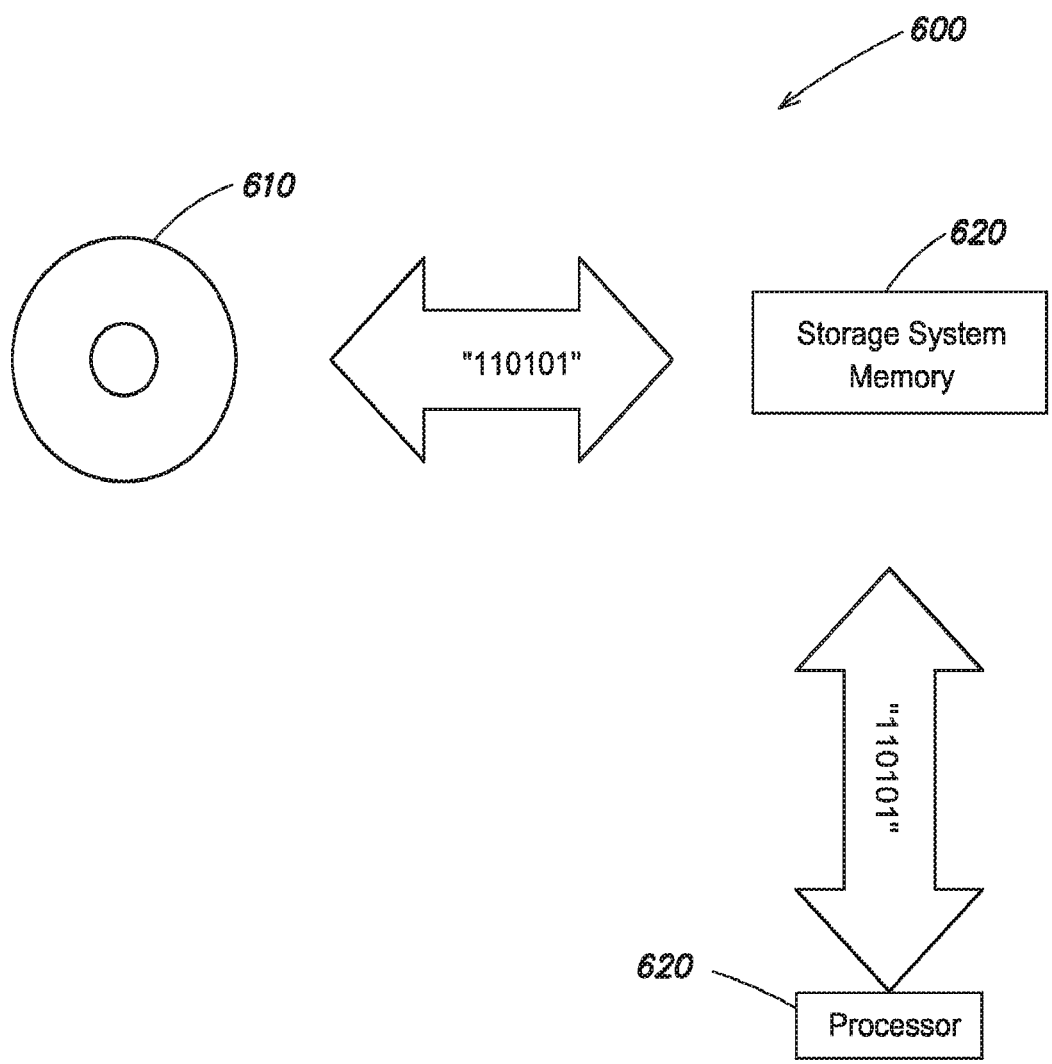
FIG. 6 is a functional block diagram of a general-purpose storage system in accordance with the general-purpose computer system of FIG. 5.

The storage system 550, shown in greater detail in FIG. 6, typically includes a computer readable and writeable nonvolatile recording medium 610 in which signals are stored that define a program to be executed by the processor or information stored on or in the medium 610 to be processed by the program to perform one or more functions associated with embodiments described herein. The medium may, for example, be a disk or flash memory. Typically, in operation, the processor causes data to be read from the nonvolatile recording medium 610 into another memory 620 that allows for faster access to the information by the processor than does the medium 610. This memory 620 is typically a volatile, random access memory such as a dynamic random-access memory (DRAM) or static memory (SRAM). It may be located in storage system 600, as shown, or in memory system 530. The processor 520 generally manipulates the data within the integrated circuit memory 530, 620 and then copies the data to the medium 610 after processing is completed. A variety of mechanisms are known for managing data movement between the medium 610 and the integrated circuit memory element 530, 620, and the disclosure is not limited thereto. The disclosure is not limited to a particular memory system 530 or storage system 550.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 500 is shown by way of example as one type of computer system upon which various aspects of the disclosure may be practiced, it should be appreciated that aspects of the disclosure are not limited to being implemented on the computer system as shown in FIG. 6. Various aspects of the disclosure may be practiced on one or more computers having a different architecture or components shown in FIG. 6. Further, where functions or processes of embodiments of the disclosure are described herein (or in the claims) as being performed on a processor or controller, such description is intended to include systems that use more than one processor or controller to perform the functions.

Computer system 500 may be a general-purpose computer system that is programmable using a high-level computer programming language. Computer system 500 may be also implemented using specially programmed, special purpose hardware. In computer system 500, processor 520 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A method of ontology model-based application development, comprising:
    defining an ontological model specifying a plurality of ontology classes and relationships therebetween;
    generating, autonomously by an ontology-library generator, an ontology library based on an ontology library template, wherein the ontology library abstracts the plurality of ontology classes and relationships defined in based on the ontological model and configured for use in generating ontology instances, wherein the generated ontology library contains a plurality of generated functions corresponding to a first ontology class within the plurality of ontology classes within the ontological model;
    deploying the ontology library to an Internet of Things ("IoT") system;
    autonomously generating an ontology instance based on the ontology library deployed to the IoT system, wherein the ontology instance is derived from an IoT application executing within the IoT system;
    exposing an adaptation layer of the IoT system through an ontology representation to provide information to a business intelligence layer; and
    managing, by the IoT application, the IoT system utilizing the generated ontology instance and the business intelligence layer.

2. The method of claim 1, wherein the defined ontological model is composed of a plurality of ontological models.

3. The method of claim 1, wherein the ontological model is defined by an autonomous system.

4. The method of claim 3, wherein the ontological model is defined by a machine learning system.

5. The method of claim 1, wherein the generated ontology library is configured for an embedded IoT application.

6. The method of claim 1, wherein the generated ontology library is configured for a cloud based IoT application.

7. A non-transitory computer-readable medium storing sequences of computer executable instructions for managing data, the sequences of computer-executable instructions including instructions that instruct at least one processor to:
    define an ontological model specifying a plurality of ontology classes and relationships therebetween;
    generating, autonomously by an ontology-library generator, an ontology library based on an ontology library template, wherein the ontology library abstracts the plurality of ontology classes and relationships defined in based on the ontological model and configured for use in generating ontology instances, wherein the generated ontology library contains a plurality of generated functions corresponding to a first ontology class within the plurality of ontology classes within the ontological model;
    deploy the ontology library to an Internet of Things ("IoT") system;
    autonomously generate an ontology instance based on the ontology library deployed to the IoT system, wherein the ontology instance is derived from an IoT application executing within the IoT system;
    exposing an adaptation layer of the IoT system through an ontology representation to provide information to a business intelligence layer; and
    managing, by the IoT application, the IoT system utilizing the generated ontology instance and the associated business intelligence layer.

8. The non-transitory computer-readable medium of claim 7, wherein the defined ontological model is composed of a plurality of ontological models.

9. The non-transitory computer-readable medium of claim 7, wherein the instructions further instruct the at least one processor to autonomously define the ontological model.

10. The non-transitory computer-readable medium of claim 9, wherein the instructions further instruct the at least one processor to execute at least one machine-learning algorithm to define the ontological model.

11. The non-transitory computer-readable medium of claim 7, wherein the generated ontology library is configured for an embedded IoT application.

12. The non-transitory computer-readable medium of claim 7, wherein the generated ontology library is configured for a cloud based IoT application.

13. A system for ontology model-based application development, comprising:
  a network computer, including:
    a transceiver that communicates over a network;
    a memory that stores at least an instruction set; and
    one or more processor devices which execute instructions to perform actions, including:
      defining an ontological model specifying a plurality of ontology classes and relationships therebetween;
      generating, autonomously by an ontology-library generator, an ontology library based on an ontology library template, wherein the ontology library abstracts the plurality of ontology classes and relationships defined in based on the ontological model and configured for use in generating ontology instances, wherein the generated ontology library contains a plurality of generated functions corresponding to a first ontology class within the plurality of ontology classes within the ontological model;
      deploying the ontology library to an Internet of Things ("IoT") system;
      autonomously generating an ontology instance based on the ontology library deployed to the IoT system, wherein the ontology instance is derived from an IoT application executing within the IoT system; and
      exposing an adaptation layer of the IoT system through an ontology representation to provide information to a business intelligence layer; and
      managing, by the IoT application, the IoT system utilizing the generated ontology instance and the associated business intelligence layer.

14. The computer of claim 13, wherein the defined ontological model is composed of a plurality of ontological models.

15. The computer of claim 13, wherein the ontological model is defined by an autonomous system.

16. The computer of claim 15, wherein the ontological model is defined by a machine learning system.

17. The computer of claim 13, wherein the generated ontology library is configured for an embedded IoT application.

18. The computer of claim 13, wherein the generated ontology library is configured for a cloud based IoT application.

* * * * *